UNITED STATES PATENT OFFICE.

CAMPBELL C. CARPENTER, OF NIAGARA FALLS, NEW YORK, ASSIGNOR TO U. S. LIGHT & HEAT CORPORATION, OF NIAGARA FALLS, NEW YORK, A CORPORATION OF NEW YORK.

METHOD FOR TREATING STORAGE-BATTERY SEPARATORS.

1,380,353.  Specification of Letters Patent.  Patented June 7, 1921.

No Drawing.   Application filed August 26, 1918.  Serial No. 251,425.

*To all whom it may concern:*

Be it known that I, CAMPBELL C. CARPENTER, a citizen of the United States, residing at Niagara Falls, in the county of Niagara and State of New York, have invented new and useful Improvements in Methods for Treating Storage-Battery Separators, of which the following is a specification.

The present invention relates to methods for treating storage battery separators.

More particularly the present invention relates to methods for treating storage battery separators whereby said separators may be stored or shipped for long distances.

In the manufacture of storage batteries it is common practice to treat sheets of wood in such a way as to change their characteristics, whereby to provide storage battery separators. After being treated, the separators are washed with water, which process leaves a quantity of water in the pores thereof. If such separators remain for any considerable period in contact with the air, they will shrink and become broken. It is practically impossible to restore them to usable shape.

An object of the present invention is to provide a method whereby said separators, after having been prepared and washed, may be put in such a condition that they may be stored and shipped without shrinking.

In the practice of the present invention, the separators, after having been treated and washed in the usual way, are further treated in a bath of sulfuric acid. Preferably, said sulfuric acid should be of high specific gravity. It has been found in practice that acid of a specific gravity of from 1200 to 1350, is satisfactory. The acid used will replace the water in the pores of the separators and will effectually prevent shrinkage for considerable periods of time.

It is common practice to manufacture separators by boiling sheets of wood in a caustic solution, neutralizing the caustic with acid and washing the separators with several changes of water. The method of manufacturing the separator is immaterial, however, in the practice of the present invention, inasmuch as the after treatment with sulfuric acid seems to possess decided advantages, regardless of how the separator has been manufactured.

What I claim as new and desire to secure by Letters Patent of the United States, is—

1. The method of preparing separators for storage or shipment which consists of treating finished separators in sulfuric acid.

2. The method of preparing separators for storage or shipment which consists of treating finished separators in sulfuric acid of relatively high specific gravity.

3. The method of preparing separators for storage or shipment which consists of treating finished separators in sulfuric acid of specific gravity of from 1200 to 1350.

4. Storage battery practice which consists in treating wood separators which are wet with water to the action of sulfuric acid.

In witness whereof I have hereunto subscribed my name.

CAMPBELL C. CARPENTER